United States Patent
Bradley et al.

(10) Patent No.: US 9,300,620 B2
(45) Date of Patent: Mar. 29, 2016

(54) SHARING TOPICS IN SOCIAL NETWORKING

(71) Applicant: International Business Machines Corporation, Armonk, NY (US)

(72) Inventors: Lisa M. Bradley, Cary, NC (US); Nan Li, Cedar Park, TX (US); Charles E. Wiese, Raleigh, NC (US); Marissa A. Wood, Hurst, TX (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 13/789,841

(22) Filed: Mar. 8, 2013

(65) Prior Publication Data

US 2014/0258399 A1    Sep. 11, 2014

(51) Int. Cl.
  *G06F 15/16* (2006.01)
  *H04L 12/58* (2006.01)
  *H04L 12/18* (2006.01)

(52) U.S. Cl.
  CPC .............. *H04L 51/32* (2013.01); *H04L 12/185* (2013.01)

(58) Field of Classification Search
  CPC ......... H04L 51/04; H04L 51/06; H04L 51/08; H04L 51/10; H04L 51/12; H04L 51/16; H04L 51/18; H04L 51/32–51/38
  See application file for complete search history.

(56) References Cited

U.S. PATENT DOCUMENTS

| | | | |
|---|---|---|---|
| 7,832,003 B2 | 11/2010 | Kelly et al. | |
| 8,126,973 B2 * | 2/2012 | Bryant et al. | 709/206 |
| 8,180,804 B1 * | 5/2012 | Narayanan et al. | 707/798 |
| 8,773,437 B1 * | 7/2014 | Goldman | G06F 17/30864 345/440 |
| 2006/0294192 A1 * | 12/2006 | Mao et al. | 709/213 |
| 2009/0307345 A1 | 12/2009 | Carter et al. | |
| 2012/0131002 A1 * | 5/2012 | Rakshit | 707/736 |
| 2013/0179237 A1 * | 7/2013 | Hull et al. | 705/12 |
| 2014/0032659 A1 * | 1/2014 | Marini et al. | 709/204 |

OTHER PUBLICATIONS

Facebook Developers, "Like Button for the Web," Product Docs, p. 1-3, https://developers.facebook.com/docs/plugins/like-button, Accessed on May 13, 2015.

Facebook Help, "When I comment on a follower's photo or like post on my Page, the comment appears to be posted from my personal Facebook account," Help Center—Facebook Pages, p. 1, http://www.facebook.com/help/?faq=201503123225716#When-I-comment-on-a-follower's-photo-or-like-their-post-on-my-Page,-the-comment-appears-to-be-posted-from-my-personal-Facebook-account, Accessed on May 13, 2015.

(Continued)

*Primary Examiner* — Umar Cheema
*Assistant Examiner* — Anh Nguyen
(74) *Attorney, Agent, or Firm* — Patricia B. Feighan; Dermott Cooke (57) ABSTRACT

A method for separating the sharing of topics in social networking. The method includes receiving digital content, for example a web page, from a social network provider using a computer. The method receives data from the social network provider, for example, groups and lists. The method analyzes the topics displayed in the digital content to determine a category for the digital content, for example, work-related or entertainment. The digital content is assigned a category based on a match of the plurality of topics displayed in the digital content. The digital content for the shared topic is then selectively shared with the participants of the groups.

20 Claims, 3 Drawing Sheets

(56) References Cited

OTHER PUBLICATIONS

Google, "Best of Google Plus," Search—Google+, p. 1, https://plus.google.com/s/google plus#s/google plus, Accessed on May 13, 2015.
Reither, "How to Link Your Existing Social Networking Accounts to Your Newest One, Google Buzz," R3R Blog, Feb. 11, 2010, p. 1-2, http://r3r.com/blog/2010/linking-other-sites-to-buzz, Accessed on May 13, 2015.
Ya, "How to Separate Facebook Personal Profile from Business Page (Pt.1)," Wchingya How To, Aug. 18, 2010, p. 1-33, http://www.wchingya.com/2010/08/protect-facebook-profile-business-page.html, Accessed on May 13, 2015.

* cited by examiner

SHARING TOPICS IN SOCIAL NETWORKING

FIELD

The present invention relates generally to the field of social networking using a computer on a communications network, and more particularly relates to a system and method of sharing topics in social networking according to a user-defined policy.

BACKGROUND

Computerized social networks provide a means of interaction among computer users through communities they build over time to share interests, activities, and business connections. Upon joining a social network, a member may create a digital persona, which may be expressed as a profile, where the member's various likes and interests can be listed, such as politics, movies, books, religious affiliations, sports, and professional associations. In one embodiment of a social network, when a member selects a social plugin button on a web page, the social network represented by the social plugin button updates the member's profile and preference history, indicating to other community members that there are topics in the digital content 210 that the member finds interesting. A typical web page may contain one or more social plugins 212, each representing a particular social network provider 205 as an icon. Typical actions represented by a social plugin 212 may include a RSS feed (Rich Site Summary), "follow," "recommend," and "like."

The member's updated data may be broadcast to all members, or only to one or more subsets, based on the member's defined privacy settings. However, there may be topics that the member would prefer not to share with some members in the social community, for example, political discussions. Similarly, the default handling of a member's profile may reveal far more personal information than is desirable for a member's safety and privacy. While social networks typically provide a manual method of dividing members into groups and assigning them various privacy settings, the process places the responsibility of maintaining an appropriate security policy on the member. Further, the process is labor intensive and depends on the member remembering to select an appropriate privacy setting for the digital content 210 before selecting the social plugin button on the web page.

It would therefore be desirable to increase privacy and control of personal data in a social network community by providing an improved method and system for sharing topics in social networking.

BRIEF SUMMARY

According to an aspect of the invention, a method for sharing topics in social networking, comprises: monitoring a plurality of electronic communications between a member of one or more social networks and a plurality of participants in electronic communications on a communications network for a pattern of communication, using a software program tool on a computer having a processor for executing the software program tool; determining one or more relationships between the member and the plurality of participants based at least in part on a pattern of communications on a shared topic; grouping the participants according to the relationships and adding the participants and participant data to a respective group; assigning a sharing parameter for the group according to a user-defined policy; analyzing digital content of the electronic communications selected by the member for a shared topic matching the participants with one or more groups when the member selects a social plugin within the digital content; and selectively sharing the digital content for the shared topic with the participants of the groups.

In another aspect of the invention, a computer program product for sharing topics in social networking, the computer program product including a program embodied on a computer readable storage medium, the program including code executable by a processor to perform a method comprises: monitoring a plurality of electronic communications between a member of one or more social networks and a plurality of participants in electronic communications on a communications network for a pattern of communication, using a software program tool on a computer having a processor for executing the software program tool; determining one or more relationships between the member and the plurality of participants based at least in part on a pattern of communications on a shared topic; grouping the participants according to the relationships and adding the participants and participant data to a respective group; assigning a sharing parameter for the group according to a user-defined policy; analyzing digital content of the electronic communications selected by the member for a shared topic matching the participants with one or more groups when the member selects a social plugin within the digital content; and selectively sharing the digital content for the shared topic with the participants of the groups.

In another aspect of the invention, a computer system for sharing topics in a social network, the computer system comprising one or more processors, one or more computer-readable storage devices, and a software program tool having a plurality of program modules stored on at least one of the one or more storage devices for execution by at least one of the one or more processors, the plurality of program modules comprises: a communications monitor module configured to monitor a plurality of electronic communications between a member of one or more social networks and a plurality of participants in electronic communications on a communications network for a pattern of communications; a relationship module configured to determine a degree of sharing of digital content to one or more of the groups when the member selects a social plugin within the digital content and manage grouping of the participants based at least in part on the pattern of communications on a shared topic; a digital content analysis module configured to extract one or more of a type of token from digital content; matching the token against a topic associated with a group; and assigning the digital content to the group based on a plurality of matches; a data management module configured to manage software program tool data, including: electronic communications data; relationship data; social graph data; and group data; and a social network interface module configured to access one or more social networks through a respective API (application programming interface).

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

As used herein, a group refers generally to a grouping of participants communicating on a communications network with the member, also referred to as the user. The user and the participants may also share membership in a social network. This relationship may also be called a group, list or circle, depending on the terminology used by the social network provider 205. In an embodiment of this invention, the user may use the software program tool 280 to define groups that are independent from groups the user may create within a social network. These groups may be based on a level of relatedness to the user, for example, co-workers, participants in a bowling league with the user, or only acquaintances. The user's social community may be defined as the degree of relatedness of the user to the social network, which may consist of all, or only a subset, of the membership of the social network. A social graph may also be used to visually depict the member's degree of relatedness within the social network. Depending on the terminology used by the social network provider, a member may also be referred to as a friend, follower, or friend of a friend.

Figure 1:
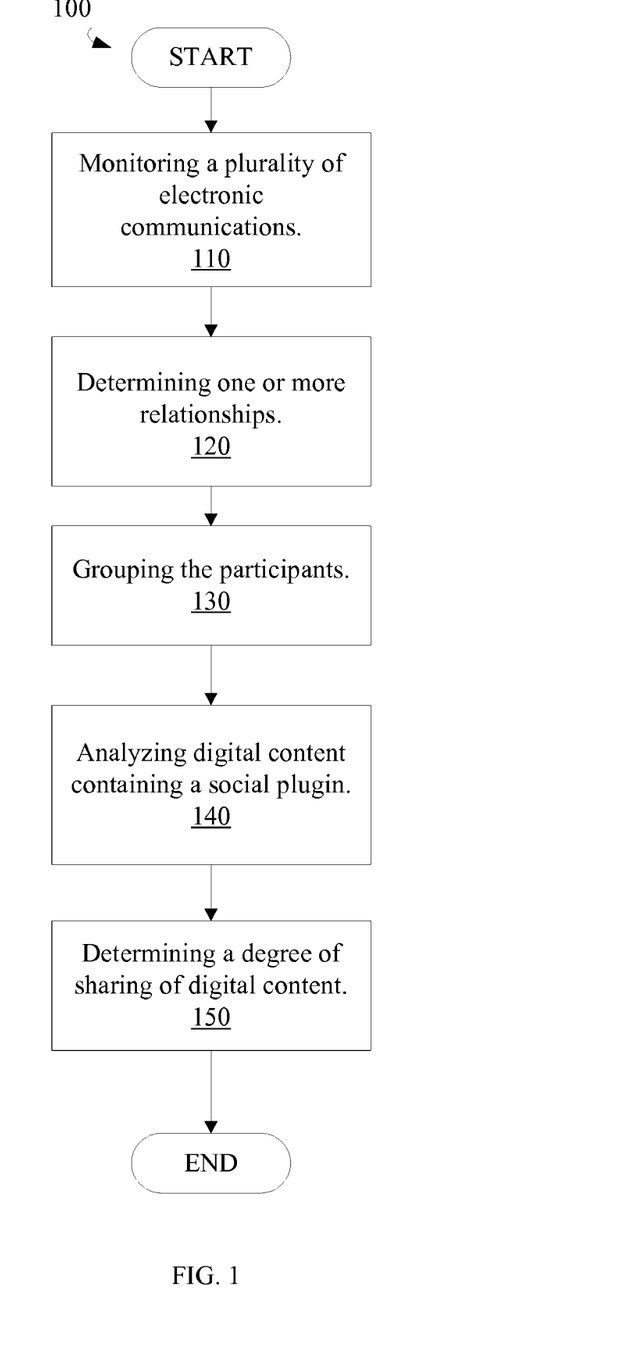
FIG. 1 is a flow chart illustrating an overview of an embodiment of a method according to the present invention.
Figure 2:
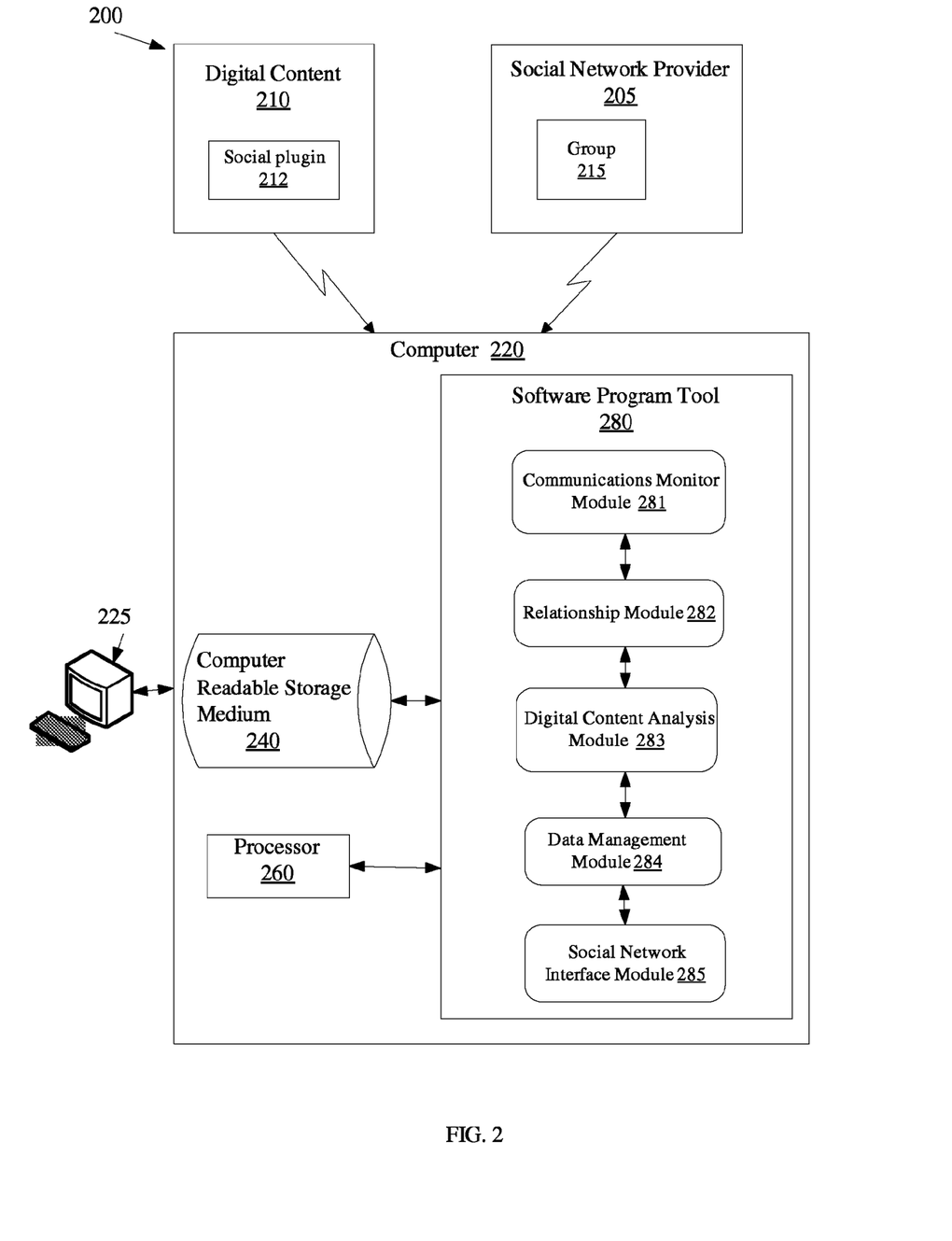
FIG. 2 is a schematic block diagram of a computer system and inputs according to the method shown in FIG. 1.
Figure 3:
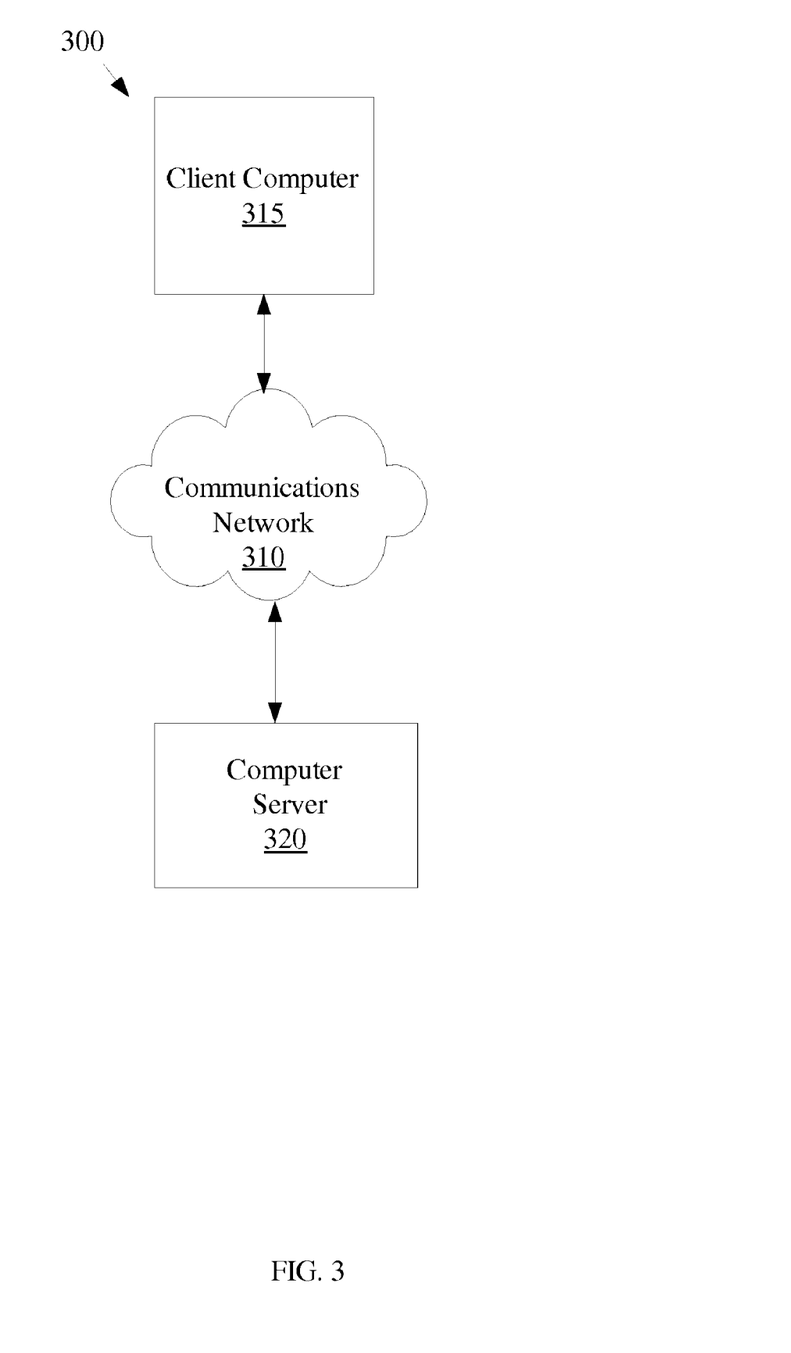
FIG. 3 is a schematic block diagram illustrating an alternative embodiment of a computer system and inputs according to the method shown in FIG. 1.

Referring to FIGS. 1 and 2, a system 200 and method 100 according to an embodiment of the invention separates and shares topics within a social network 205. The system 200 includes a software tool 280 incorporating the steps of the method 100. The software program tool 280 may be stored on a computer readable storage device 240 of a network-connected computer 220, which includes a processor 260 for executing the steps of a program, i.e., the program 280. The computer may include a user interface 225 through which a user may access the computer 220 and connect to the social network 205. In this embodiment, the software program tool 280 and the user interface 225 are components of the network-connected computer 220. However, in another embodiment, for example, FIG. 3, the software tool 280 may reside on a separate computer server 320 that is accessible over a communications network 310. FIG. 3 is similar to a cloud computer configuration, where a computer user may access a central computer server 320 over a communications network 310 using a client computer 315. The computer server 320 may host a plurality of separate ISPs (Internet Service Provider) or other similar software services providers, each delivering its services, such as the software program tool 280, by subscription to a computer user. In FIG. 3, the client computer 315 includes other devices that may be configured to execute the software program tool 280, such as a mobile personal device, a smartphone, and a mobile personal computer. The software program tool 280 may include: a browser plugin; a browser extension; a mobile application; and a client-server program.

Referring to FIG. 1, step 110 represents the start of the method 100. Step 110 invokes the communications monitor module 281 of the software program tool 280 to monitor digital communications between the member and a plurality of participants on a communications network. The participants may share one or more relationships with the member, such as co-workers, sports team members, church members, or close friends. The communications monitor module 281 communicates with the relationship module 282 and the digital content analysis module 283, discussed in detail below, to develop a pattern of communications between the member and another participant in an electronic communication on a communications network.

In step 110, the communications monitor module 281 is configured by the member to intercept electronic communications, such as e-mail, a URL, or chat session, being sent and received by the member. Past communications through a social networking site may also be configured as input to the communications monitor module 281. By selectively omitting participants, topics, or programs, the member may configure the level of monitoring to protect the member's privacy or security. Data intercepted by the communications monitor module 281, including the participants' contact data, such as IP (Internet Protocol) address; screen name; and e-mail address; may be stored by the data management module 284 on the computer readable storage medium 240 for later analysis by the relationship module 282 and the digital content analysis module 283.

In step 120, the relationship module 282 determines the degree of relatedness between the member and the participants. In one embodiment, the social network interface module 285 may execute a social network provider's API to retrieve the member's social graph. A social network provider 205 may maintain a social graph as a visual representation of the degree of relatedness between the member and a fellow member within a social network. The degree of relatedness may be represented by the relative number of shared connections, or shared topics of communication, between the member and a fellow member. A shared connection may be a type of object including, for example, an article; a blog; a book; a movie; a video; a website; and a custom-defined object. Alternatively, where a social graph is not available from the social network provider 205, the social network interface module 285 may retrieve such relationship data as the social network provider 205 may publish, for example, group 215 and related data that the member defines. In another embodiment, the relationship module 282 may be expanded to create a social graph using, for example a BFS (breadth-first-search) technique, which is a well-known strategy for searching the nodes of a graph. Input to a BFS operation may include relationship data published by the social network provider 205, or contact data extracted from the member's e-mail or chat provider address book. Step 120 communicates with the data management module 284 to extract the digital communications data stored on the computer readable storage medium 240 in step 110 by the communications monitor module 281. Similar to the processing of step 140 below, step 120 invokes the digital content analysis module 283 to parse the digital communications data and add the results of the textual analysis to the relationship data. The relationship data developed by the relationship module 282 may be stored by the data management module 284 on the computer readable storage medium 240 for subsequent processing by the software program tool 280, if needed.

In step 130, the relationship module 282 communicates with the data management module 284 to extract social graph and other group and contact data that is stored on the computer readable storage medium 240. A group created in step 130 may be permanently stored on the computer readable storage medium 240, for example, where the locally stored group matches one created by the user on a social network provider 205. A permanent group may be useful where a member frequently communicates with the group's members, as in a social club sending event notices, but does not necessarily want to execute an appropriate API corresponding to a social network provider. Similarly, contact information may be extracted from the stored data to create a temporary group for a one-time communication. For example, either type of group may be beneficial to a business user wanting to target advertising to likely customers.

When the user selects a social plugin 212 being displayed within digital content 210, step 140 invokes the digital content analysis module 283 to parse the digital content 210, using textual analytics, for a corresponding topic and an appropriate audience for sharing. The digital content analysis module 283 may be extended by adding a textual analytics software program that the user may configure to accommodate a plurality of digital content 210. In another embodiment, the user may add a configurable list of topics, represented by tokens, along with contact information for likely participants in sharing communications about the topics. Typical tokens may include a URL, one or more fields within the HTML metadata of a web page, or a tag, keyword or pattern embedded in the digital content 210.

Step 150 uses the topic determined by the textual analysis of step 140 as input to the relationship module 282 to search for the appropriate degree of sharing that matches the topic of the digital content 210 presently being viewed by the user. When a matching topic is located in the relationship data, the participants who are allowed to share the topic and who are members of the social network represented by the social plugin 212 are retrieved. A group sharing the topic may already exist in the relationship data. Alternatively, a temporary group may be created for the purpose of updating the social network provider 205. The relationship module 282 extracts and formats the relationship data according to the API that is required by the social network provider 205 represented by the social plugin 212. The social network interface module 285 may invoke the API published by the social network provider to update the member's preference history and to execute the action expressed by the social plugin 212, for example a "like." In another embodiment, an artificial intelligence component may be added to the software program tool 280 to automatically determine or adjust the appropriate audience and level of sharing of the digital content 210, using at least in part a pattern of previous communications.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for sharing topics in social networking, comprising:
    monitoring a plurality of electronic communications between a member of one or more social networks and a plurality of participants in electronic communications on a communications network for a pattern of communication, using a software program tool on a computer having a processor for executing the software program tool;
    determining one or more relationships between the member and the plurality of participants based at least in part on a pattern of communications on a shared topic, wherein the determining the one or more relationships includes retrieving a social graph from a social network provider associated with the member and creating a new social graph representing the relationship between the member and the plurality of participants, wherein the new social graph is created using a breadth-first search (BFS) technique based on input from relationship data published by the social network provider, a plurality of contact data extracted from an email account associated with the member, and a chat provider address book associated with the member;
    storing a plurality of data associated with the determined one or more relationships on a non-transitory computer readable storage medium;
    grouping the participants according to the stored plurality of data associated with the determined one or more relationships and adding the participants and participant data to a respective group, wherein grouping the participants and adding the participants and participant data to a respective group comprises creating a permanent group of participants that is permanently stored on the non-transitory computer readable storage medium and creating a temporary group of participants that is temporarily stored on the non-transitory computer readable storage medium, wherein the permanent group is created based on determining the added participants and the added participant data matches the retrieved social graph from a social network provider and wherein the temporary group is created based on determining the added participants and the added participant data do not match the retrieved social graph from a social network provider;
    assigning a sharing parameter for the group according to a user-defined policy;
    analyzing digital content of the electronic communications selected by the member for a shared topic matching the participants with one or more groups when the member selects a social plugin within the digital content;
    selectively sharing the digital content for the shared topic with the participants of the groups;
    in response to the social plugin not being selected and the member selecting the created permanent group, sharing a plurality of new digital content with the selected permanent group; and
    in response to the social plugin not being selected and the member selecting the created temporary group, sharing the plurality of new digital content with the temporary group.

2. The method of claim 1, wherein the step of selectively sharing includes allowing and preventing viewing accessibility of one or more of the shared topics by the participants in the matching groups, according to a user-defined policy.

3. The method of claim 1, further comprising:
    extracting one or more tokens from the digital content containing the social plugin, the token including one or more of: a tag; a keyword; HTML metadata; a URL; and a pattern;
    analyzing the tokens from the digital content for a topic matching one or more groups where the participants share the topic with the member;
    matching the tokens against the topic associated with the group; and
    assigning the digital content to the group based on a plurality of matches.

4. The method of claim 1, wherein the plurality of communications includes: an e-mail; an instant message; an online chat; a VoIP (voice over IP) communication; and an electronic posting to an online forum.

5. The method of claim 1, wherein the pattern of communication includes: a frequency of the electronic communications between the member and the participant; a social graph representing the relationship between the member and the participant; and a topic.

6. The method of claim 1, wherein the software program tool includes: a browser plugin; a browser extension; a mobile application; and a client-server program.

7. The method of claim 1, wherein the digital content is a web page including one or more of: a text; a sound recording; a photograph; and a video.

8. The method of claim 1, wherein the participant contact data includes one or more of: an e-mail address; a screen name; a social network provider name; an IP address; and a URL.

9. A computer program product for sharing topics in social networking, the computer program product including a program embodied on a non-transitory computer readable storage medium, the program including code executable by a processor to perform a method comprising:
    monitoring a plurality of electronic communications between a member of one or more social networks and a plurality of participants in electronic communications on a communications network for a pattern of communication, using a software program tool on a computer having a processor for executing the software program tool;

determining one or more relationships between the member and the plurality of participants based at least in part on a pattern of communications on a shared topic, wherein the determining the one or more relationships includes retrieving a social graph from a social network provider associated with the member and creating a new social graph representing the relationship between the member and the plurality of participants when the social graph cannot be retrieved, wherein the new social graph is created using a breadth-first search (BFS) technique based on input from relationship data published by the social network provider, a plurality of contact data extracted from an email account associated with the member, and a chat provider address book associated with the member;

storing a plurality of data associated with the determined one or more relationships on the non-transitory computer readable storage medium;

grouping the participants according to the stored plurality of data associated with the determined one or more relationships and adding the participants and participant data to a respective group, wherein grouping the participants and adding the participants and participant data to a respective group comprises creating a permanent group of participants that is permanently stored on the non-transitory computer readable storage medium and creating a temporary group of participants that is temporarily stored on the non-transitory computer readable storage medium, wherein the permanent group is created based on determining the added participants and the added participant data matches the retrieved social graph from a social network provider and wherein the temporary group is created based on determining the added participants and the added participant data do not match the retrieved social graph from a social network provider;

assigning a sharing parameter for the group according to a user-defined policy;

analyzing digital content of the electronic communications selected by the member for a shared topic matching the participants with one or more groups when the member selects a social plugin within the digital content;

selectively sharing the digital content for the shared topic with the participants of the groups;

in response to the social plugin not being selected and the member selecting the created permanent group, sharing a plurality of new digital content with the selected permanent group; and in response to the social plugin not being selected and the member selecting the created temporary group, sharing the plurality of new digital content with the temporary group.

10. The computer program product of claim 9, wherein the step of selectively sharing includes allowing and preventing viewing accessibility of one or more of the shared topics by the participants in the matching groups, according to a user-defined policy.

11. The computer program product of claim 9, further comprising:

extracting one or more tokens from the digital content containing the social plugin, the token including one or more of: a tag; a keyword; HTML metadata; a URL; and a pattern;

analyzing the tokens from the digital content for a topic matching one or more groups where the participants share the topic with the member;

matching the tokens against the topic associated with the group; and assigning the digital content to the group based on a plurality of matches.

12. The computer program product of claim 9, wherein the plurality of electronic communications includes: an e-mail; an instant message; an online chat; a VoIP (voice over IP) communication; and an electronic posting to an online forum.

13. The computer program product of claim 9, wherein the pattern of communication includes: a frequency of the electronic communications between the member and the participant; a social graph representing the relationship between the member and the participant; and a topic.

14. The computer program product of claim 9, wherein the software program tool includes: a browser plugin; a browser extension; a mobile application; and a client-server program.

15. The computer program product of claim 9, wherein the digital content is a web page including one or more of: a text; a sound recording; a photograph; and a video.

16. The computer program product of claim 9, wherein the group includes: a list of participants; a description; a topic; participant contact data; and a privacy setting.

17. The computer program product of claim 16, wherein the participant contact data includes one or more of: an e-mail address; a screen name; a social network provider name; an IP address; and a URL.

18. A computer system for sharing topics in a social network, the computer system comprising one or more processors, one or more computer-readable storage devices, and a software program tool having a plurality of program modules stored on at least one of the one or more storage devices for execution by at least one of the one or more processors, the plurality of program modules comprising:

a communications monitor module configured to monitor a plurality of electronic communications between a member of one or more social networks and a plurality of participants in electronic communications on a communications network for a pattern of communications;

a relationship module configured to determine a degree of sharing of digital content to one or more of the groups when the member selects a social plugin within the digital content and manage grouping of the participants based at least in part on the pattern of communications on a shared topic, wherein the determining the degree of sharing of digital content includes, retrieving a social graph from a social network provider associated with the member and creating a new social graph representing the relationship between the member and the plurality of participants, wherein the new social graph is created using a breadth-first search (BFS) technique based on input from relationship data published by the social network provider, a plurality of contact data extracted from an email account associated with the member, and a chat provider address book associated with the member;

a digital content analysis module configured to extract one or more of a type of token from digital content; matching the token against a topic associated with a group; and assigning the digital content to the group based on a plurality of matches;

a data management module configured to manage software program tool data, including: electronic communications data; relationship data; social graph data; and group data, wherein the data management module is further configured to:

store a plurality of data associated with a determined one or more relationships on a non-transitory computer readable storage medium;

group the participants according to the stored plurality of data associated with the determined one or more relationships and add the participants and participant data to a respective group, wherein grouping the participants and adding the participants and participant data to a respective group comprises creating a permanent group of participants that is permanently stored on the non-transitory computer readable storage medium and creating a temporary group of participants that is temporarily stored on the non-transitory computer readable storage medium, wherein the permanent group is created based on determining the added participants and the added participant data matches the retrieved social graph from a social network provider and wherein the temporary group is created based on determining the added participants and the added participant data do not match the retrieved social graph from a social network provider;

assign a sharing parameter for the group according to a user-defined policy;

analyze digital content of the electronic communications selected by the member for a shared topic matching the participants with one or more groups when the member selects a social plugin within the digital content;

selectively share the digital content for the shared topic with the participants of the groups;

in response to the social plugin not being selected and the member selecting the created permanent group, sharing a plurality of new digital content with the selected permanent group;

in response to the social plugin not being selected and the member selecting the created temporary group, sharing the plurality of new digital content with the temporary group; and a social network interface module configured to access one or more social networks through a respective API.

19. The computer system of claim 18, wherein the software program tool includes: a browser plugin; a browser extension; a mobile application; and a client-server program.

20. The computer system of claim 18, wherein the plurality of electronic communications includes: an e-mail; an instant message; an online chat; a VoIP (voice over IP) communication; and an electronic posting to an online forum.

* * * * *